Dec. 20, 1927.
C. M. TERRY
1,653,324
AUTOMATIC REGULATING MEANS FOR STEAM PLANTS
Filed Feb. 24, 1925
3 Sheets-Sheet 1
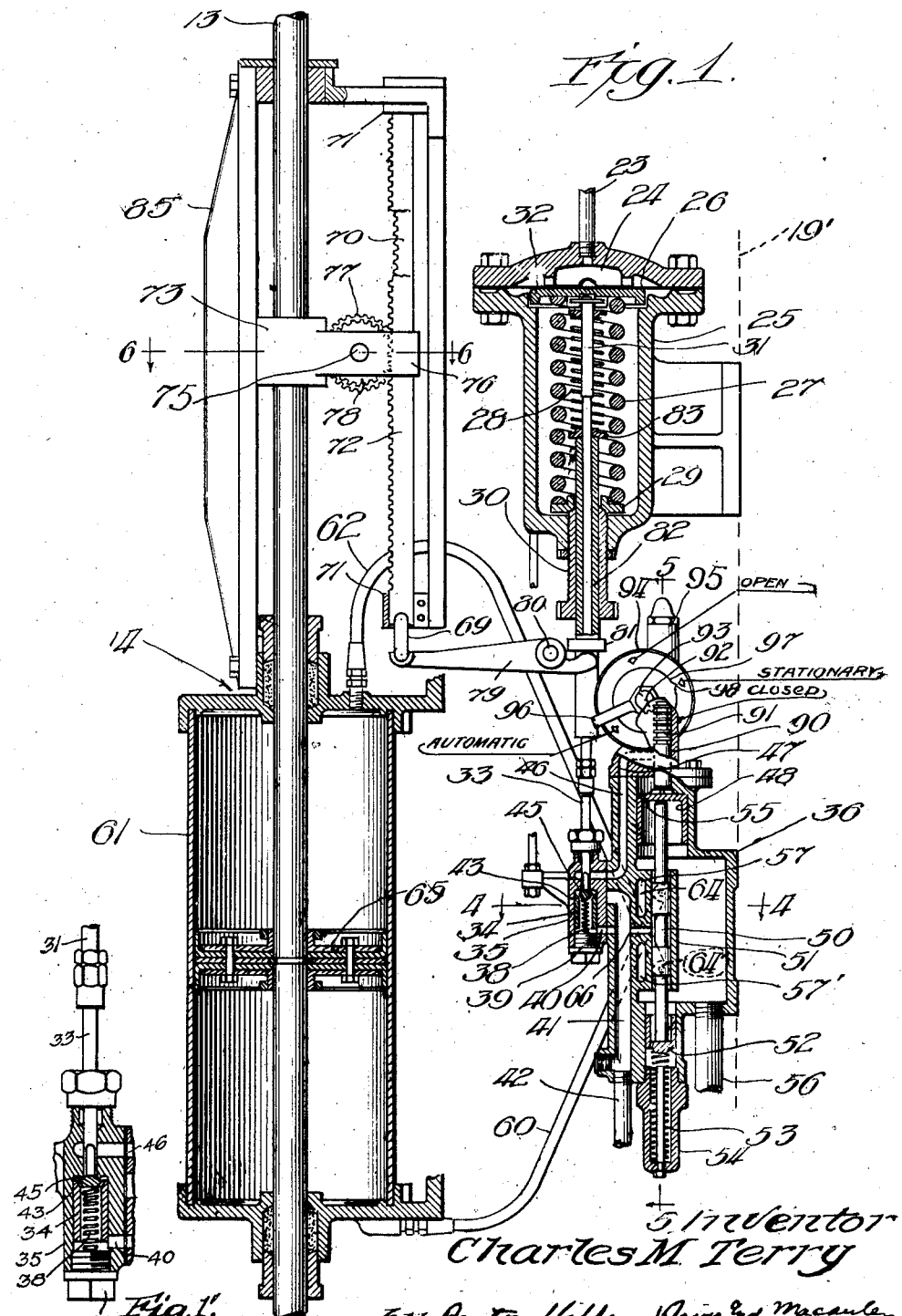

Dec. 20, 1927.
C. M. TERRY
1,653,324
AUTOMATIC REGULATING MEANS FOR STEAM PLANTS
Filed Feb. 24, 1925   3 Sheets-Sheet 2
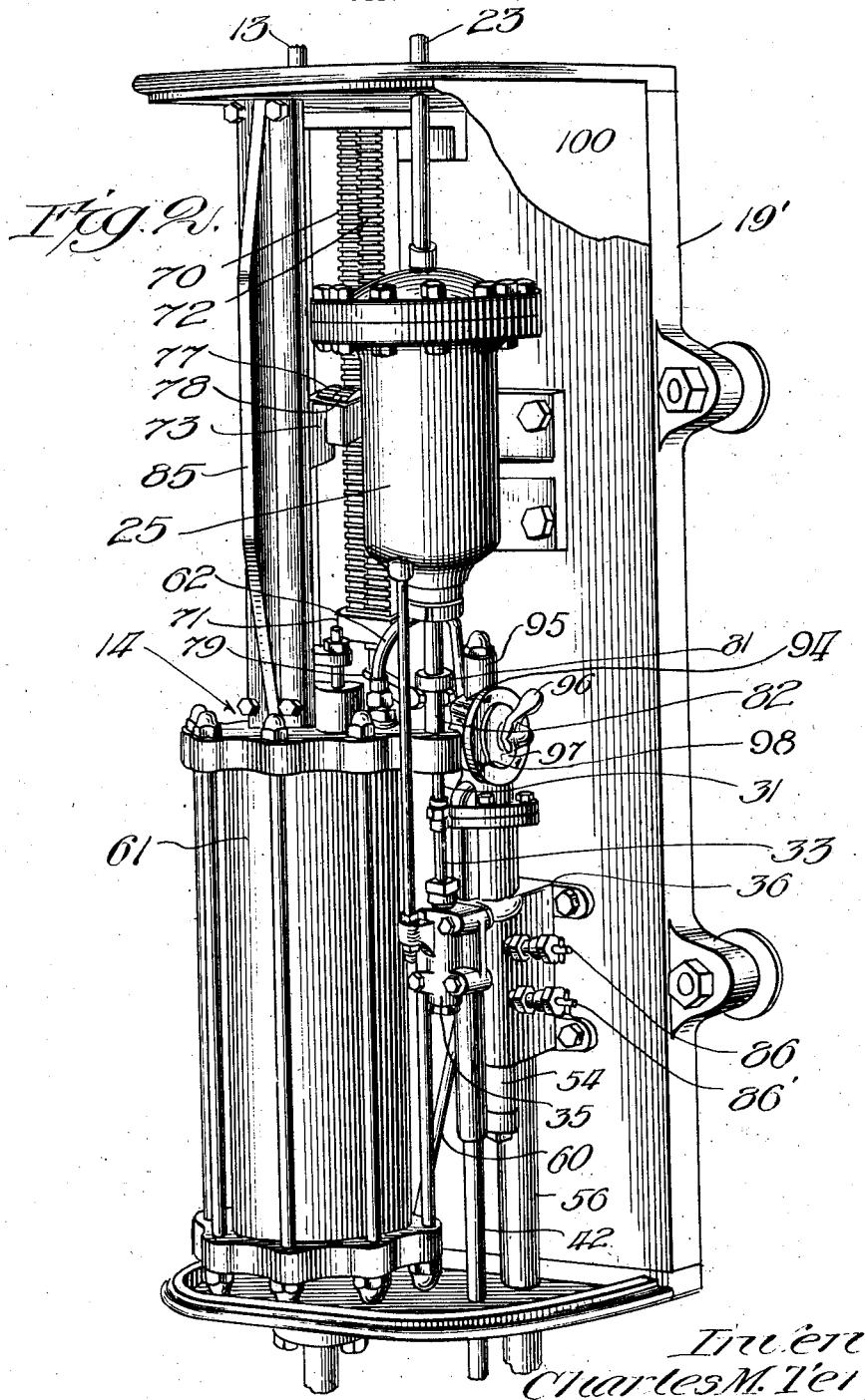
Inventor:
Charles M. Terry
by Rector, Hibben, Davis and Macauley
Attys Dec. 20, 1927.
C. M. TERRY
1,653,324
AUTOMATIC REGULATING MEANS FOR STEAM PLANTS
Filed Feb. 24, 1925     3 Sheets-Sheet 3
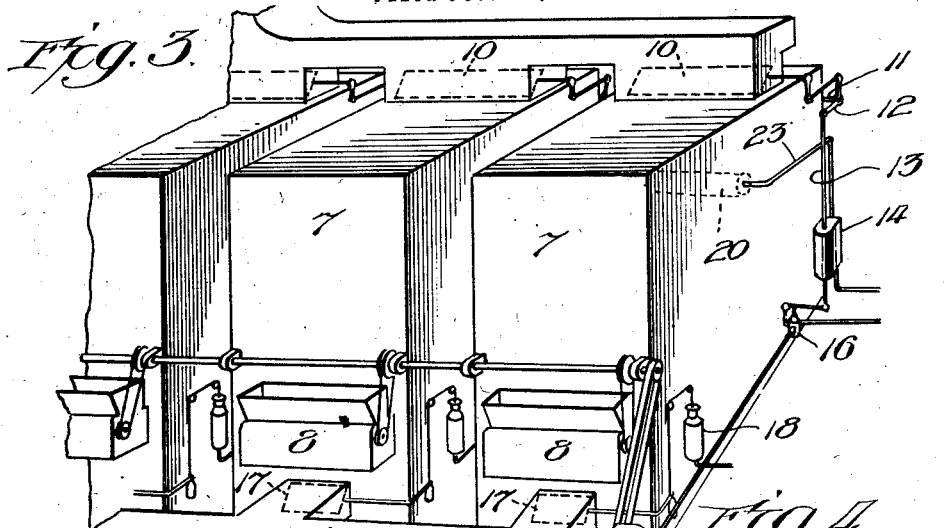
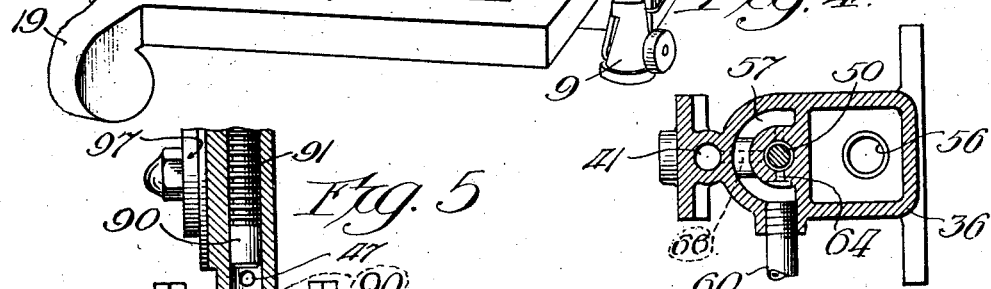
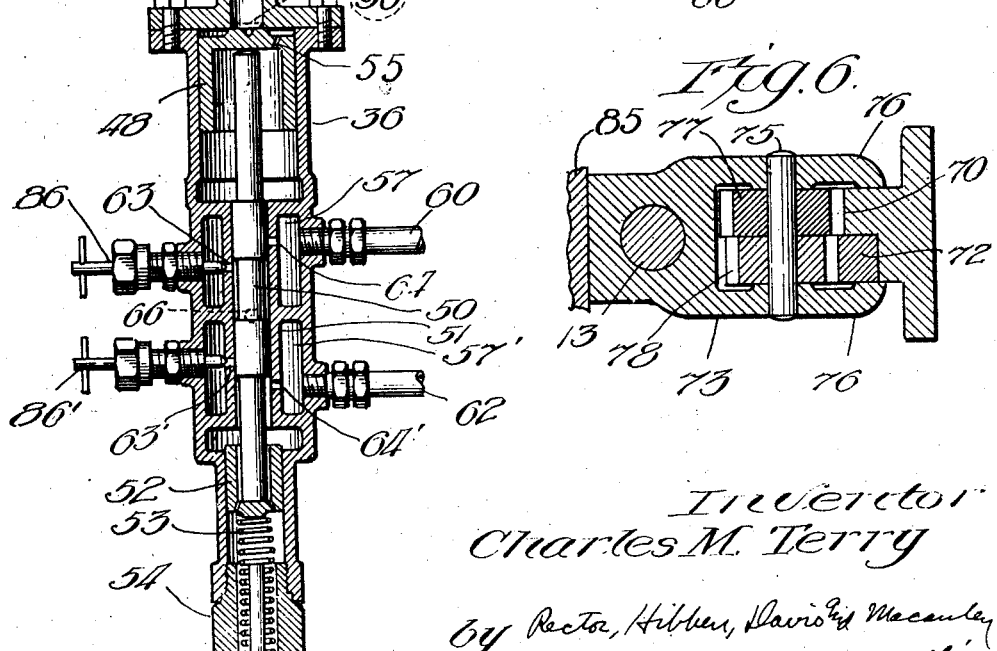
Inventor
Charles M. Terry
by Rector, Hibben, Davis & Macauley
Attys Patented Dec. 20, 1927.

1,653,324

UNITED STATES PATENT OFFICE.

CHARLES M. TERRY, OF DECATUR, ILLINOIS, ASSIGNOR TO A. W. CASH COMPANY, OF DECATUR, ILLINOIS, A CORPORATION OF DELAWARE.

AUTOMATIC REGULATING MEANS FOR STEAM PLANTS.

Application filed February 24, 1925. Serial No. 11,071.

My invention relates to regulators or controllers adapted for use in connection with furnaces of steam generators, and more particularly, to that type of generators in which the rate of combustion of the fuel is maintained in direct relation to the steam demand upon the boilers. I have disclosed herein my invention as applied to that type of regulator in which a movable pressure-responsive member, such as a diaphragm, is exposed to the boiler pressure and controls the operation of the valve mechanism which in turn controls the passage of the motive fluid, such as water, to either end of a fluid operated motor, which is preferably of the double acting type, and operates the various devices for supplying the fuel to the furnaces, controlling the draft or other conditions attending combustion.

The principal object of my invention is to provide an improved regulator which is highly efficient and dependable in operation and so constructed that it regulates the rate of combustion in the furnaces directly responsive to the demand on the boilers, the regulator being of the floating type in which the piston of the position-determining motor may take and maintain any position whatever within its limits of travel, the motor being controlled by very sensitive yet dependable valve mechanisms.

Another important object of my invention is to provide the regulator with an improved compensating mechanism well adapted to efficiently take care of pressure variations over the entire operating range to insure positive and accurate compensatory action at all times. More particularly, this compensating mechanism comprises positive differential mechanism in the form of racks and gears for transmitting movement of the power piston to a compensating spring coacting with the pressure-responsive control device.

It is also an object of my invention to provide in combination with the regulator, effective and simple means for adapting the regulator for use on boiler equipment of various kinds and sizes or operable under widely varying conditions. In the present form of embodiment, these adjustable means comprise manually operated valves for controlling the rate of flow of the motive fluid to and from the opposite sides of the power piston of the fluid operated motor so that the speed or rate of travel of the piston in either or both directions may be regulated to satisfy the operating demands or conditions.

A further object of the invention is to provide the regulator with improved manually controlled mechanism for interrupting the automatic functioning of the regulator and permitting its operation to be controlled entirely by hand. To this end, I have provided a novel arrangement of manually operated means for controlling entirely by hand the operation of the valve mechanism which controls the flow of motive fluid to and from the fluid operated motor.

Still another object of my invention is to provide novel and simple valve mechanism for controlling operation of the fluid operated motor under the control of the pressure-responsive device.

With a view to obtaining these objects, and others that will become apparent from the following description, my invention consists in the features of construction and in the combination and arrangement of parts hereinafter set forth and claimed.

In the drawings, wherein I have illustrated a single embodiment of my invention for the purposes of disclosure of one practical utilization thereof, Figure 1 is a vertical sectional view through the regulator embodying my invention, the view being somewhat diagrammatic in nature as the valve mechanisms and control means are shown spaced rearwardly of the hydraulic motor; Fig. 1ᵃ is an enlarged vertical sectional view taken through one of the valves; Fig. 2 is a perspective view of the regulator; Fig. 3 is a diagrammatic view of a boiler plant showing, for the sake of illustration, my invention applied thereto to show one form of power plant installation in which my invention may be used; Fig. 4 is a detail section view taken on the line 4—4 of Fig. 1; Fig. 5 is a vertical section through one of the valves, the section being taken on the line 5—5 of Fig. 1; and Fig. 6 is a detail horizontal section taken on the line 6—6 of Fig. 1 through the gears and racks of the compensating mechanism.

Referring to Fig. 3, I have disclosed diagrammatically a battery of boilers 7, the furnaces of which are provided with stoker feed mechanisms 8 operated from a common motor 9 through a common shaft. In the flues of the individual boilers are the draft dampers 10 operated from a common jack shaft 11. The shaft 11 is operated from a lever 12 which in turn is operated by the piston rod 13 of the hydraulic motor 14, comprising part of my improved regulator. The lower end of piston rod 13 is connected to a valve 16 for regulating the steam flow to the motor 9 and thus controlling the speed of the motor 9. For the sake of illustration, I have shown each of the blast dampers 17 in the branches of the forced draft conduit as being controlled by a combustion controller 18 so that the forced draft from the fan mechanism 19 past each of these blast dampers 17 is independently controlled by the pressure in the furnace, as is well understood in the art, while the stoker feed and the dampers in the flues are controlled through my master regulator under the control of the steam in the steam header 20. The combustion controllers 18 are shown diagrammatically as they may be of any approved type.

Referring now to Figs. 1 and 2, the main steam header 20 is connected by a pipe 23 to a pressure chamber 24 formed by a diaphragm 26 in the top of a well-known form of casing 25 secured in any suitable manner to a supporting frame or plate 19'. The variable steam pressure applied to the diaphragm 26 is balanced by a pressure spring 27 and a compensating spring 28 mounted within the casing 25. The lower end of the spring 27 is seated on a disc 29 which is carried by an adjustable sleeve 30 which is screw-threaded into the bottom of the casing 25 and is manually adjustable through the enlargement on its lower end to vary the pressure of the spring 27 and thus accommodate various plant steam pressures. A stem 31 is connected at its upper end to a contact head 32 for the diaphragm 26 and projects downwardly through a sleeve 82 slidable within the sleeve 30.

The lower end of the stem 31 (Fig. 1) is adapted to contact with the upwardly extending stem 33 of a hollow valve 34 mounted in a valve casing 35 which, in turn, is secured in any suitable manner to the larger valve casing 36 secured in any suitable manner to the frame 19' carrying the apparatus. The valve 34 is supported by a spring 38 mounted within the valve and seated on the plug 39 closing the lower end of the valve casing 35.

The valve casing 35 communicates through a port 40 with an inlet conduit 41 formed in the valve casing 36 and supplied through a pipe 42 with water, oil or other fluid under constant pressure from any suitable source. Water flowing through the valve chamber 35 passes through ports 43 in the valve 34, past the valve seat 45, through a conduit 46 and a port 47 formed in the head of the valve casing 36. Normally a plunger 90, to be described later, is in the raised position shown in Fig. 5, rather than in its lowered position shown in Fig. 1, so that the port 47 is normally opened. Mounted in the upper end of the valve casing 36 is a piston 48 supported on the upper end of the valve stem of a double piston valve 50 mounted in a bore or valve chest 51 formed in the valve casing 36. The downwardly extending stem of the valve 50 is supported on a piston 52 which in turn is supported by a spring 53 seated in a hollow extension plug 54 screwed into the opening in the lower end of the valve casing 36. The water or other motive fluid flowing past the port 47 drains through a small opening 55 in the piston 48 into the valve casing from whence it drains through a drain pipe 56.

The valve casing 36 is provided with two semi-circular chambers 57 and 57' which, as shown in Fig. 4 are semi-circular in horizontal cross-section. The chamber 57 is connected by a pipe 60 (Figs. 1 and 5) to the lower end of a power cylinder 61 of the fluid operated motor and the chamber 57' is connected to the upper end of this power cylinder by a pipe 62.

When the diaphragm 26 is balanced by the steam pressure on its upper side and the springs 27 and 28 on its lower side, the water passing the valve seat 45 is of such volume that the leakage port 55 in the piston 48 permits the water to drain into the valve casing 36 at a rate sufficient to cause the pressure of the water on the piston 48 to balance the pressure of the spring 53 so that the valve 50 is maintained in the balanced position, in which it closes admission port 63 and drain port 64, communicating with the chamber 57, and the admission port 63' and the drain port 64' communicating with the chamber 57', so that no water flows to or drains from cylinder 61 on either side of the power piston 65 and hence the power piston is held in the set position so long as the steam pressure does not change. When the steam pressure increases, the valve 34 is opened to permit a greater volume of water to pass into the upper end of the valve casing 36, and, as the drain port 55 is small, pressure builds up on the piston 48 and lowers the valve 50 against the action of the spring 53. This movement of the valve uncovers the drain port 64, so that some of the water above the power piston drains into the casing 36 and passes out through the drain pipe 56, and also uncovers the admission port 63' so that water may pass from the conduit 41 through a port 66 into the bore 51, thence through the admission port 63', chamber 57' and the pipe 62, to the upper end of the hydraulic motor, with the result that the power piston is lowered. When this occurs with the installation shown in Fig. 3, the flue dampers 10 are slightly closed and the speed of the stoker feed mechanism is decreased. If, on the other hand, the pressure in the steam boilers decreases, then the springs 27 and 28 raise the diaphragm and stem 31 and permit the valve 34 to close more or less, dependent upon the extent of fall of pressure in the steam boilers, so that the pressure on the piston 48 is decreased and the spring 53 raises the valve 50 and if the pressure boiler has been materially reduced, the spring 53 raises the valve past its closed position to uncover the drain port 64' and the admission port 63, as shown in Fig. 5, with the result that the power piston is raised to reverse the movement of the boiler dampers and speed up the operation of the stoker feed mechanism.

The compensating mechanism, which will now be described, is so arranged and constructed as to be positive in action and insure proper regulation of the positioning and travel of the power piston at all times. Referring to Figs. 1, 2 and 6, a stationary rack 70 is secured to the supporting frame 19 and adjacent to it is a vertically movable rack 72 slidably mounted at its upper and lower ends in brackets 71 secured to the ends of the rack 70. The two racks have teeth of the same shape and size. Fast to the piston rod 13 is a bracket 73 having rearwardly extending arms 76 engaging on opposite sides of the racks 70 and 72 on the frame 19' to prevent rotation of the bracket 73 and piston rod 13. Mounted on a pin 75, supported in the arms of the bracket 73, are two gears 77 and 78 meshing with the racks 70 and 72, respectively. The gear 77 has more teeth than the gear 78, preferably two. The lower end of the movable rack 72 is connected by a link 69 to one end of a lever 79 which is pivoted at 80 to a fixed bracket and has its opposite forked end engaging under a collar 81 secured to the lower end of the sleeve 82 positioned within the adjustable sleeve 30. The upper end of the sleeve 82 carries a disc 83 on which the lower end of the compensating spring 28 is seated. The ratio of the gears and racks is such that upon travel of the power piston rod 13, the movable rack moves in direct proportion to and in the same direction as the piston rod 13 but to a much lesser extent, preferably at a ratio of 1 to 12.

From the above description of the compensating mechanism it will be obvious that upon downward movement of the piston rod 13 in response to increase in steam pressure, the rack 72 is caused to move downwardly through the action of the gears and racks and, through the lever 79 and sleeve 82 this movement of the rack 72 increases the pressure of the compensating spring 28 until a point is reached where the increased steam pressure on the diaphragm is balanced, with the result that the control valve 34 is raised and the piston valve 50 is moved to close all of the ports 63, 64, 63' and 64', whereby the power piston 65 is held to its new position which may be at any point between its opposite extreme positions. It will be obvious that upon a decrease of steam pressure in the boilers, the reverse operation takes place, the pressure of the compensating spring 28 being reduced until the diaphragm is again balanced, at which time the pilot valve 50 again moves to its normal position and the power piston 65 is held in its newly set position. Since the power piston takes a definite position and bears direct relation to any given steam pressure within the operating range, it is evident that the regulator functions in the so-called "floating" manner. The compensating action is positive in operation and will always be the same for a given extent of power piston travel, regardless of the direction of travel or the position from which the power piston is moved. There is also no lost motion in transmitting the movement of the power piston to the compensating spring 28. A vertically positioned bar 85 is fixed in front of the piston and the forward end of the bracket 73 is adapted to slide on the rear side of the bar so that the bar acts as a bearing and takes the thrust of gears 70 and 72 and maintains them in constant positive mesh with their racks.

In order to adapt the regulator for use on boiler plants having many and varied operating conditions and demands, I have provided means whereby the sensitiveness of its control, or in other words, its time of response to steam pressure changes may be manually controlled. In some plants it may be advisable to adjust the device for immediate response in the rate of fuel feed and air supply to wide fluctuations in steam demands, while in others it may be well to permit considerable variation in steam pressure and at the same time very gradual changes in the fuel feed and air supply, etc., and hence gradually change the rate of combustion of the fuel. In order that my regulator may meet such varying demands of regulation, I provide adjustable needle valves 86 and 86', which control the size of the admission ports 63 and 63', so that the needle valve 86 may regulate the flow of water to the lower side of the power piston and the needle valve 86' may regulate the flow of water to the upper side of the power piston. The needle valves 86 and 86' may be adjusted to so regulate the flow of water to either end of the hydraulic motor as to cause a gradual movement of the power piston 65 in both directions upon changes in steam pressure, there being a considerable time lag between a sudden change in steam pressure and movement of the power piston 65 to a position responding to the new pressure. If a more immediate response to changes in steam pressure is desirable, in either one or both directions of the power piston, the desired action may be obtained by properly adjusting the needle valves. It will be observed that the drain ports 64 and 64' are out of alignment with the corresponding admission ports 63 and 63' so that the port 64 or 64' is opened but the corresponding admission port 63 or 63' is closed, and vice versa, and the flow of water to the opposite ends of the hydraulic motor may be regulated by the needle valves 86 and 86'.

I have also provided means by which the operator can discontinue or interrupt the automatic functioning of the regulator and assume complete hand control of the stokers, fan, or other units controlled by the regulator, and thus control the rate of steam production for the entire plant instantly and at will from one point. In the preferred form of embodiment this hand control mechanism comprises a plunger 90 (Figs. 1 and 5) having a rack 91 (formed by circumferential teeth) meshing with a gear 92 fast on a shaft 93 journaled in a casing 94, which is provided with an extension 95 within which the upper end of the plunger 90 is adapted to slide and be guided. Fast on the shaft 93 is a hand lever 96, and a disc 97 having an indicating point 98. When the regulator is to be automatically controlled by the steam pressure, the handle 96 is in such position that the point 98 is opposite the index point marked "Automatic" on the face of the casing 94, so that the lower end of the plunger 90 is positioned in the upper end of the head of the casing 36 (as shown in Fig. 5) to permit free passage of the water from the conduit 46 through the port 47. Assuming that it is desirable to completely open the dampers, speed up the fan and stoker feed motor to their maximum speed or otherwise suddenly increase the rate of combustion the lever 96 is moved to the "Open" indexed position, in which position the lower end of the plunger is flush with the lower face of the head, as indicated in dot-dash lines 90, in Fig. 5, whereupon the spring 53 raises the valve 50 to permit the water to move the power piston to the upper extent of its range of movement. If the rate of combustion is to be reduced to its minimum, the handle 96 is moved to the "Closed" index position, whereupon the plunger 90 assumes its lowermost position and positively lowers the valve 50 and hence causes the power piston 65 to move to its lower limit of movement. In case it is desired to retain the power piston 65 in any intermediate position under hand control, the handle 96 is moved to the "Stationary" index position, as shown in Fig. 1, the valve 50 then being held in its intermediate position by the plunger 90 and spring 53 to close the conduits to both ends of the power cylinder and thus hold the power piston in stationary position as long as desired. A semi-circular cover 100, shown broken away in Fig. 2, may be pivoted at one edge and is adapted to enclose the device when the cover is shut, to exclude dust and dirt.

From the foregoing description, it will be obvious that my improved regulator is well adapted to perform the functions primarily stated. It will be understood that while I have described in some detail a particular embodiment of my invention for purposes of full disclosure thereof, changes may be made in various particulars without departure from the spirit and scope of my invention defined in the following claims.

I claim:

1. In a regulating device of the class described, the combination of a pressure-responsive device, a fluid operated motor having a piston structure operated under the control of said pressure-responsive device, and compensating mechanism between said device and piston structure and comprising differential rack and gear means.

2. In a regulating device of the class described, the combination of a pressure-responsive device, a fluid operated motor having a piston structure operated under the control of said pressure-responsive device, and compensating mechanism between said piston structure and device and including gears carried by said piston structure, a stationary rack meshing with one of said gears, and a movable rack meshing with the other of said gears.

3. In a regulating device of the class described, the combination of a pressure-responsive device, a fluid operated motor having a piston structure operated under the control of said pressure-responsive device, and compensating mechanism between said device and piston structure and comprising a compensating spring associated with said pressure-responsive device, two gears rotated in unison and of different sizes, a rack meshing with the smaller gear and a rack meshing with the larger gear, and connections between said spring and one of said other parts of said compensating mechanism.

4. In a regulating device of the class described, the combination of a pressure responsive device, a fluid operated motor having a piston and piston rod controlled by said device, a bracket carried by said piston rod, gears of different sizes carried by said bracket, a movable rack and a stationary rack meshing with said gears, and a compensating spring coacting with said pressure-responsive device and controlled by said movable rack.

5. In a regulating device of the class described, the combination of a pressure-responsive device, a fluid operated motor having a piston and piston rod controlled by said device, a bracket carried by said piston rod, gears of different sizes carried by said bracket, a movable rack and a stationary rack meshing with said gears, a compensating spring coacting with said pressure-responsive device and controlled by said movable rack, and a bearing rod coacting with said bracket to take the thrust of the gears.

6. In a regulating device of the class described, the combination of a pressure-responsive device, a fluid operated motor having a piston structure operated under the control of said pressure-responsive device, a compensating spring cooperating with said pressure-responsive device, a lever coacting therewith, a movable rack connected to said lever, a stationary rack, and gears carried by said piston rod and meshing with said racks.

7. In a regulating device of the class described, the combination of a pressure-responsive device, a fluid operated motor having a piston structure, a valve mechanism operated under the control of said pressure-responsive device for controlling said fluid operated motor, and compensating mechanism between said piston structure and pressure-responsive device and comprising sets of differential intermeshing toothed elements, a lever operated thereby and a compensating spring cooperating with said pressure-responsive device.

8. In a regulating device of the class described, the combination of a pressure-responsive device, a fluid operated motor for moving a member under the control of said pressure-responsive device, and compensating mechanism comprising a spring cooperating with said pressure-responsive device and sets of differential intermeshing toothed elements operated by said motor for controlling said spring.

9. In a regulating device of the class described, the combination of a pressure-responsive device, a fluid operated motor having a piston structure moved in opposite directions by the motive fluid, a valve controlled by said pressure-responsive device for regulating the flow of the fluid and a second valve comprising a casing connected to both ends of said motor and a valve member in said casing and operated under the control of the flow of fluid past said first valve.

10. In a regulating device of the class described, the combination of a pressure-responsive device, a fluid operated motor, a valve positioned under the control of said pressure-responsive device for regulating the flow of motive fluid, a second valve comprising a casing connected by conduit means to said motor and a valve member for opening and closing said conduit means, and a pressure piston associated with said valve member and positioned under the control of the motive fluid passing said first valve.

11. In a regulating device of the class described, the combination of a pressure-responsive device, a fluid operated motor, a constantly but variably opened valve positioned under the control of said pressure-responsive device for regulating the flow of the motive fluid, a second valve comprising a casing connected by conduit means to said fluid operated motor and a valve member for opening and closing said conduit means, and a pressure piston associated with said valve member and positioned under the control of the motive fluid passing said first valve.

12. In a regulating device of the class described, the combination of a pressure-responsive device, a fluid operated motor, a valve positioned under the control of said pressure-responsive device for regulating the flow of motive fluid past the valve, a second valve comprising a casing connected by conduit means to said motor and a valve member for opening and closing said conduit means, and a piston associated with said valve member and subjected to the pressure of the motive fluid passing said first valve, the piston being ported to permit flow of the fluid past the piston.

13. In a regulating device of the class described, the combination of a pressure-responsive device, a fluid operated motor, a valve positioned under the control of said pressure-responsive device for regulating the flow of the motive fluid past said valve, a second valve comprising a casing connected by conduit means to said fluid operated motor and a valve member in said casing for opening and closing said conduit means, a ported pressure piston mounted on said valve member and positioned under the control of the pressure of the motive fluid passing said first valve, and a spring supporting said valve member of the second valve.

14. In a regulating device of the class described, the combination of a presssure-responsive device, a fluid operated motor, a constantly but variably opened valve positioned under the control of said pressure-responsive device for regulating the flow of the motive fluid past said valve, a second valve comprising a casing connected by conduit means to said motor and a valve member in said casing for opening and closing said conduit means, a ported pressure piston mounted on said valve member and positioned under the control of the pressure of the motive fluid passing said first valve, and a spring supporting said valve member of the second valve.

15. In a regulating device of the class described, the combination of a fluid operated motor, a pressure-responsive device, valve means including a valve casing and a valve member controlled by said pressure-responsive device, conduit means between said casing and said motor, including an admission port and a drain port separately opened and closed by said valve member, and a manually adjustable valve member for varying the size of said admission port.

16. In a regulating device of the class described, the combination of a fluid operated motor, a pressure-responsive device, a valve mechanism, including a valve casing and a valve member controlled by said pressure-responsive device, separate conduit means from said casing to each end of said motor and including drain and admission ports, and manually adjustable means for varying the sizes of said admission ports.

17. In a regulating device of the class described, the combination of a fluid operated motor, a pressure-responsive device, a valve mechanism, including a valve casing and a valve member controlled by said pressure-responsive device, separate conduit means from said casing to each end of said motor and including drain and admission ports, and independently adjustable needle valves for varying the sizes of said admission ports.

18. In a regulating device of the class described, the combination of a pressure-responsive device, a fluid operated motor having a piston moved in both directions by the pressure of the motive fluid, a valve casing having a valve chest and two separate chambers, each chamber having offset admission and drain ports communicating with the chest, conduit means connecting said chambers with opposite ends of said motor, a valve element in said chest for opening and closing said drain and admission ports, and adjustable means for varying the size of certain of said ports.

19. In a regulating device of the class described, the combination of a pressure-responsive device, a fluid operated motor having a piston moved in both directions by the pressure of the motive fluid, a valve casing having a valve chest and two separate chambers, each chamber having offset admission and drain ports communicating with the chest, conduit means connecting said chambers with opposite ends of said motor, a valve element in said chest for opening and closing said drain and admission ports, and independently manually adjustable valves for varying the sizes of said admission ports as desired.

20. In a regulating device of the class described, the combination of a pressure-responsive device, a fluid operated motor, having a piston structure moved in opposite directions by the motive fluid, a valve controlled by said pressure-responsive device for regulating the flow of the motive fluid, a second valve comprising a casing connected to both ends of said motor and a valve member in said casing and operated under the control of the flow of motive fluid past said first valve to control passage of the motive fluid to the opposite ends of said motor, and independent manually adjustable means for regulating the rates of flow of motive fluid to each end of said motor.

21. In a regulating device of the class described, the combination of a pressure-responsive device, a double acting fluid operated motor, valve mechanism including a casing and a valve member controlled by said pressure-responsive device, conduit means from said casing to both ends of said hydraulic motor and opened and closed by said valve member, and independently manually adjustable devices controlling the rate of flow of the motive fluid from said valve mechanism to each end of said motor.

22. In a regulating device of the class described, the combination of a pressure-responsive device, a fluid operated motor, having a piston structure moved in opposite directions by the motive fluid, a valve controlled by said pressure-responsive device for regulating the flow of the fluid, a second valve comprising a casing connected to both ends of said motor, a valve member in said casing and operated under the control of the flow of motive fluid past said first valve, and means whereby said valve member may be operated by hand.

23. In a regulating device of the class decribed, the combination of a pressure-responsive device, a fluid operated motor, a valve positioned under the control of said pressure-responsive device for regulating the flow of motive fluid, a second valve comprising a casing connected by conduit means to said motor and a valve member for opening and closing said conduit means, a pressure piston associated with said valve member and positioned under the control of the motive fluid passing said first valve and means for controlling the operation of one of said valves entirely by hand.

24. In a regulating device of the class described, the combination of a pressure-responsive device, a fluid operated motor, a valve positioned under the control of said pressure-responsive device for regulating the flow of the motive fluid, a second valve comprising a casing connected by conduit means to said motor and a valve member for opening and closing said conduit means, a pressure piston associated with said valve member and positioned under the control of the motive fluid passing said first valve and a manually adjustable plunger for interrupting communication between said valves and controlling the positioning of said piston and valve member manually.

25. In a regulating device of the class described, the combination of a pressure-responsive device, a fluid operated motor, a valve positioned under the control of said device for regulating the flow of motive fluid past the valve, a second valve comprising a casing connected by conduit means to said fluid operated motor and a valve member for opening and closing said conduit means, a piston associated with said valve member and subjected to the pressure of the motive fluid passing said first valve, the piston being ported to permit flow of the motive fluid past the piston, and means for interrupting the flow of the motive fluid from said first valve and manually positioning said valve member.

26. In a regulating device of the class described, the combination of a pressure-responsive device, a fluid operated motor, a valve positioned under the control of said pressure-responsive device for regulating the flow of the motive fluid past said valve, a second valve comprising a casing connected by conduit means to said motor and a valve member in said casing for opening and closing said conduit means, a ported pressure piston mounted on said valve member and positioned under the control of the pressure of the motive fluid passing said first valve, a spring supporting said valve member of the second valve, and means for interrupting the automatic control of said valve member and operating the same by hand.

27. In a regulating device of the class described, the combination of a pressure-responsive device, a motive fluid motor, a valve positioned under the control of said pressure-responsive device for regulating the flow of the motive fluid, a second valve comprising a casing connected by conduit means to said motor and a valve member for opening and closing said conduit means, a pressure piston associated with said valve member and positioned under the control of the motive fluid passing said first valve, a plunger reciprocable in said valve casing and having rack teeth, and manually adjusting means including a gear meshing with said rack teeth for interrupting communication between said valves and positioning said valve member manually.

28. In a regulating device of the class described, the combination of a pressure-responsive device, a fluid operated motor, a valve controlled by said pressure-responsive device for controlling passage of the motive fluid to said motor, and means for interrupting the automatic control of said valve and operating the same manually and adapted to close said valve to maintain the fluid operated motor in any desired stationary position.

29. In a regulating device of the class described, the combination of a pressure responsive device, a fluid operated motor, a valve controlled by said pressure-responsive device, for controlling passage of the motive fluid to both ends of said motor and comprising a casing and a valve member, conduit means connecting said casing with both ends of said motor, and including ports opened and closed by said valve member, and a manually adjustable member for operating said valve independently of said pressure-responsive device.

30. In a regulating device of the class described, the combination of a pressure-responsive device, a fluid operated motor, a valve including a valve member operated by the motive fluid under the control of said pressure-responsive device, and controlling the passage of motive fluid to said fluid operated motor, and manual means for differentially positioning said valve member independently of the motive fluid.

CHARLES M. TERRY.